(12) United States Patent
Braithwaite et al.

(10) Patent No.: US 9,518,604 B2
(45) Date of Patent: Dec. 13, 2016

(54) FLUID BEARINGS

(71) Applicants: Outotec (Finland) Oy, Espoo (FI); Daniel Braithwaite, Innaloo (AU); Jeffrey Victor Belke, Mt. Pleasant (AU); Nicholas John Green, Rivervale (AU); Chris Tate, Iluka (AU); Oscar Harrison, Balcatta (AU); Knut Vaage, Oslo (NO)

(72) Inventors: Daniel Braithwaite, Innaloo (AU); Jeffrey Victor Belke, Mt Pleasant (AU); Nicholas John Green, Rivervale (AU); Chris Tate, Iluka (AU); Oscar Harrison, Balcatta (AU); Knut Vaage, Oslo (NO)

(73) Assignee: Outotec (Finland) Oy, Espoo (FI)

( * ) Notice: Subject to any disclaimer, the term of this patent is extended or adjusted under 35 U.S.C. 154(b) by 75 days.

(21) Appl. No.: 14/410,241

(22) PCT Filed: Jun. 28, 2013

(86) PCT No.: PCT/IB2013/055305
§ 371 (c)(1),
(2) Date: Dec. 22, 2014

(87) PCT Pub. No.: WO2014/002060
PCT Pub. Date: Jan. 3, 2014

(65) Prior Publication Data
US 2015/0345556 A1 Dec. 3, 2015

(30) Foreign Application Priority Data
Jun. 28, 2012 (AU) ................................ 2012902770

(51) Int. Cl.
*F16C 32/06* (2006.01)

(52) U.S. Cl.
CPC ................................ *F16C 32/0666* (2013.01)

(58) Field of Classification Search
CPC .................................................... F16C 32/0666
See application file for complete search history.

(56) References Cited

U.S. PATENT DOCUMENTS

| | | | |
|---|---|---|---|
| 4,911,554 A | 3/1990 | Henne et al. | |
| 2006/0063442 A1* | 3/2006 | Taylor ...................... | B63H 5/14 440/78 |
| 2012/0099993 A1* | 4/2012 | Guerenbourg ...... | F03D 11/0008 416/174 |

FOREIGN PATENT DOCUMENTS

| | | | | |
|---|---|---|---|---|
| DE | 10254864 B3 * | 8/2004 | ............ | F16C 29/025 |
| DE | 102007039364 | 3/2008 | | |

(Continued)

OTHER PUBLICATIONS

International Search Report from corresponding PCT Application No. PCT/IB2013/055305, date of mailing Oct. 30, 2013, 5 pgs.

*Primary Examiner* — Thomas R. Hannon
(74) *Attorney, Agent, or Firm* — Chernoff, Vilhauer, McClung & Stenzel, LLP

(57) ABSTRACT

The present invention provides improvements to a fluid bearing for a journal, one being a polymer bearing pad with an outer surface, at least one recess for receiving lubricating fluid from a base of the fluid bearing and distributing the lubricating fluid to the outer surface and a mount for securely mounting the polymer bearing pad to the base. Other improvements include a fluid bearing with the polymer bearing pad, steps for making the polymer bearing pad and fluid bearing, a fluid bearing with a polymer bearing pad having a chamfer and a multidirectional fluid bearing.

26 Claims, 13 Drawing Sheets

(56) References Cited

FOREIGN PATENT DOCUMENTS

| | | |
|---|---|---|
| GB | 1508384 | 4/1978 |
| JP | 2006009968 | 12/2006 |
| WO | 90/12216 | 10/1990 |
| WO | 2012/145217 | 10/2012 |

* cited by examiner

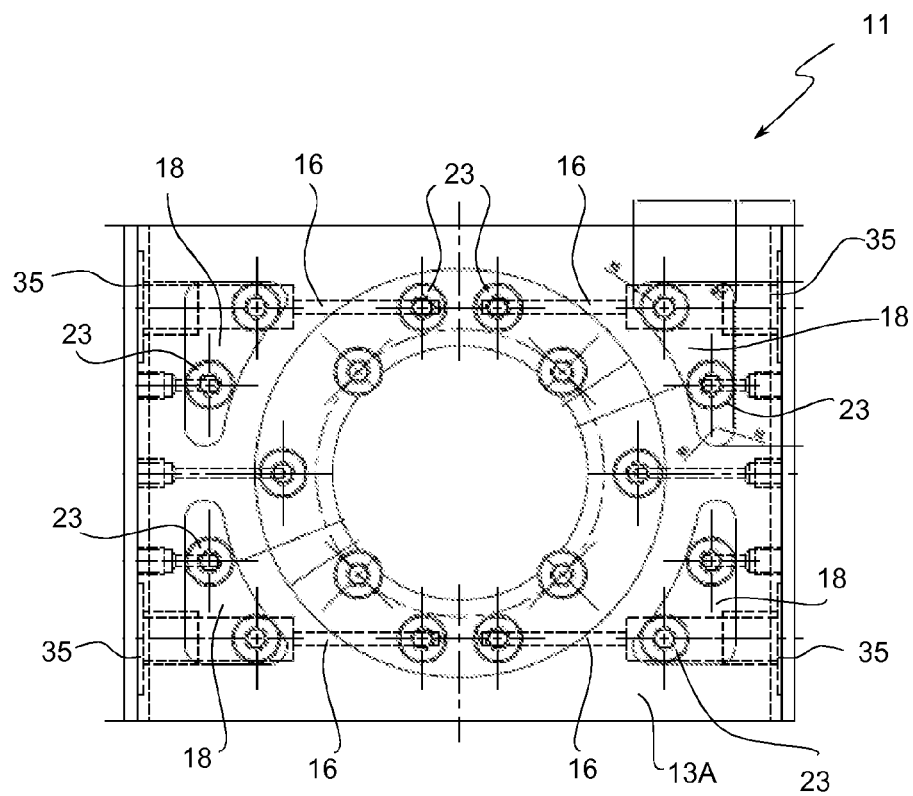
*Fig. 4*
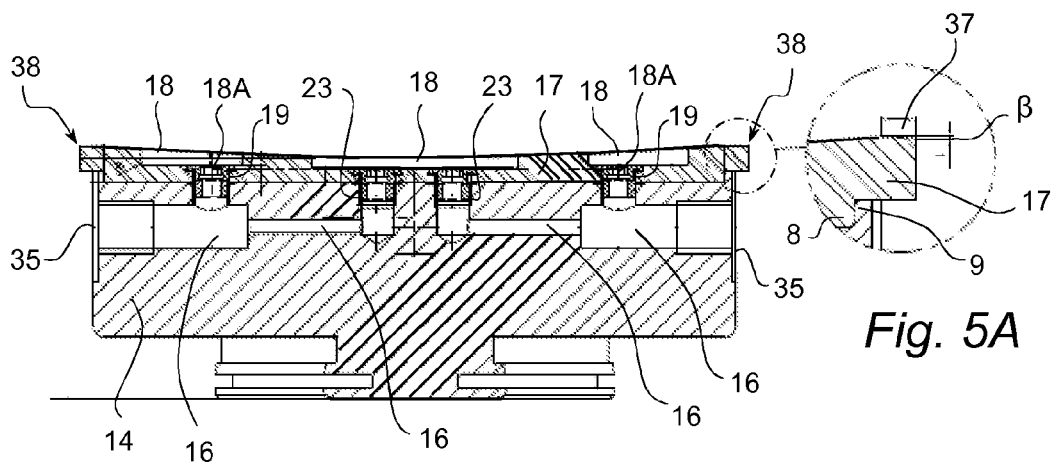
*Fig. 5*
*Fig. 5A*

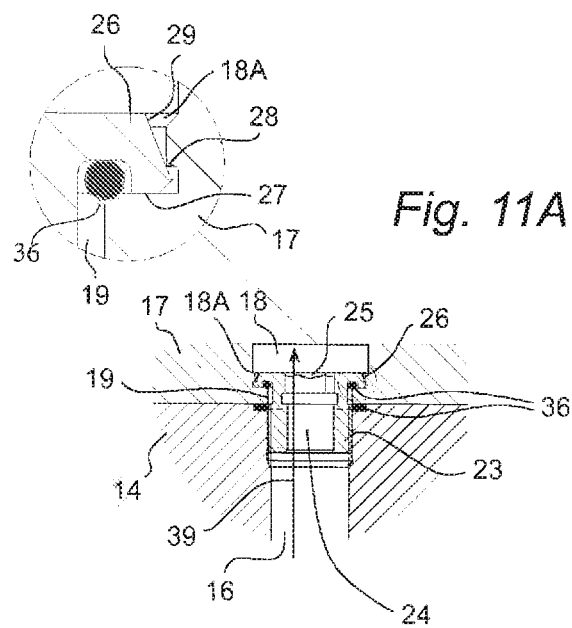
Fig. 11A
Fig. 11
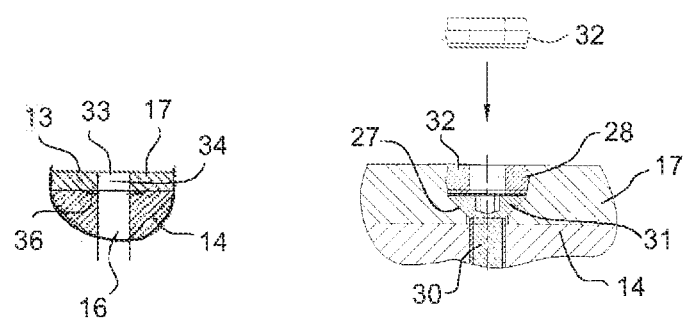
Fig. 12A
Fig. 12

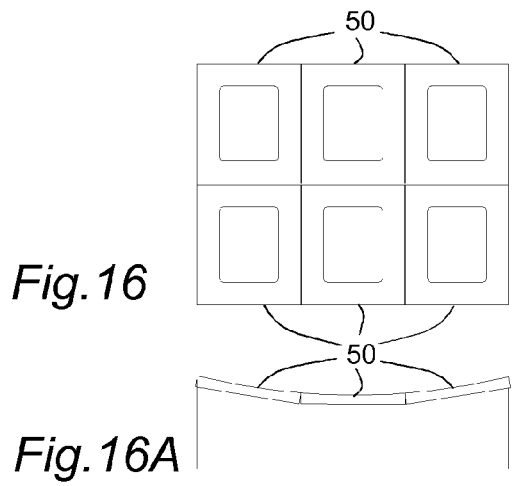
*Fig.16*
*Fig.16A*
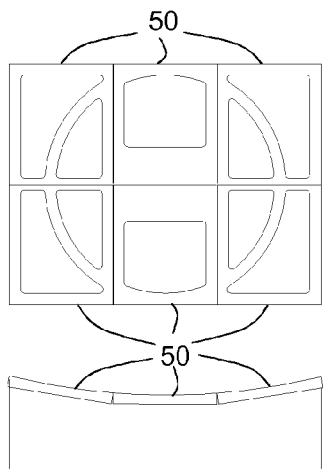
*Fig.17*
*Fig.17A*
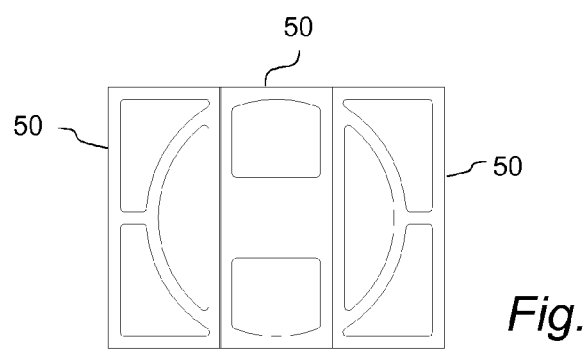
*Fig. 18*
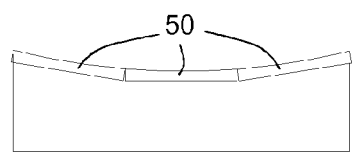
*Fig. 18A*

FLUID BEARINGS

CROSS-REFERENCE TO RELATED APPLICATIONS

This is a national stage application filed under 35 USC 371 based on International Application No. PCT/IB2013/055305, filed Jun. 28, 2013 and claims priority under 35 USC 119 of Australian Patent Application No. 2012902770 filed Jun. 28, 2012.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

FIELD OF THE INVENTION

The present invention relates to a fluid bearing and in a particular a hydrostatic polymeric bearing for use in a mill. The invention has been developed primarily for use as a hydrostatic polymeric bearing in grinding mills and will be described hereinafter by reference to this application. However, it will be appreciated that the invention is not limited to this particular field of use, but also extends to other types of fluid bearings such as hydrodynamic bearings and hybrid bearings (i.e. bearings that use a combination of hydrodynamic and continuous hydrostatic flow for lubrication).

BACKGROUND OF THE INVENTION

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

A grinding mill has a mill chamber and two journal shafts, the journals being mounted upon supports for rotation. Typical bearings have two main components; a steel base for mounting to the support and a bearing pad or surface for contact with the mill journal. These mill bearings are installed between the mill journals and the supports so that the mill journals rotate on the bearing pads during operation of the grinding mill.

The applicant developed a hydrostatic pad bearing system for grinding mills that is currently in use. In this hydrostatic pad bearing system, an external oil supply system pumps high-pressure oil to recesses machined into the bearing so that the oil forms a thin film on the bearing pad surface. The resultant hydraulic pressure is sufficient to completely lift the mill journal off the hydrostatic pads and separate the sliding surfaces. Thus, mill actually "floats" on a film of oil between journal and bearing. As such the bearing will operate under both static and dynamic conditions. Since the surfaces are completely separated and the bearing is self aligning there is no metal-to-metal contact between the bearing surface and the mill journal due to the oil film, thus resulting in only low friction. Consequently, maintaining the oil film between the surfaces means that there is virtually no wear in the bearing.

Despite the advantages conferred by this hydrostatic bearing system, a loss of oil pressure (and thus a reduction in the oil film thickness) can cause failure of the bearings, leading to damage to the bearing pad and/or the mill journal. For example, it can take a few seconds for a grinding mill to stop turning in the event of a power failure, and when this happens there is a high risk of damage to the mill bearing pads or journal surfaces due to a loss of oil reducing the oil film thickness, thereby bringing the journal and bearings into direct metal to metal contact. The consequential downtime for replacement of any damaged bearings and/or journals severely impairs operation of the mill, reducing its efficiency.

To prevent this type of damage, grinding mill lubrication systems usually have pressure accumulator systems that are typically used to store and deliver high pressure oil to the bearing in the event of a power failure and the oil supply system fails. These pressure accumulators are expensive, require frequent maintenance to ensure that they are at the appropriate pressure level and can interfere with control systems in the mill. Thus, there are increased operational and maintenance costs of the mill.

Typically, to manufacture hydrostatic bearings, the recesses are machined into the steel base and then the oil supply ports for delivering high pressure oil to the recesses are then drilled into the base. Bronze is spray welded or cast onto the relevant parts of the steel base to form the bearing pad or lining. Spray welding enables the bronze metal to form a seal with the base. White metal may be used instead of bronze, but is cast onto the base. Due to this manufacturing process, the repair and/or refurbishment of these bearings involves initially cleaning the damaged bearing surface, machining any parts of the steel base and either spray welding the bronze or re-casting the bronze/white metal. This repair process cannot be performed on-site but requires the bearing to be returned to the manufacturer. Consequently, mills must keep a sufficient stock of spare bearings to account for the absence of damaged bearings being repaired. This adds to the maintenance costs of the mill.

It is an object of the present invention to overcome or substantially ameliorate one or more of the disadvantages of prior art, or at least to provide a useful alternative.

It is an object of the invention in at least one preferred form to provide improved fluid bearings for mills that are more tolerant to the loss of oil film, distortions in the journal, require less strict manufacturing tolerances, can be easily repaired, minimise waste and reduce or eliminate the need for pressure accumulators, and a method for making such fluid bearings.

BRIEF SUMMARY OF THE INVENTION

According to a first aspect of the invention, there is provided a bearing assembly for supporting a journal of a grinding mill body, comprising a frame and a plurality of fluid bearings, said fluid bearings each comprising a polymer bearing pad mounted to a base, said polymer bearing pad comprising an outer surface, at least one recess for receiving lubricating fluid from at least one passage of said base and distributing said lubricating fluid to said outer surface and mounting means for securely mounting said polymer bearing pad to said base, said base also comprising at least one lubricating fluid supply port in fluid communication with said at least one passage, wherein said base is mounted to said frame so that said fluid bearings self adjust to changes in the angular position of the journal during operation of said grinding mill body.

A second aspect of the present invention provides a bearing assembly for supporting a journal of a grinding mill body, comprising a frame and a plurality of fluid bearings, said fluid bearings each comprising a polymer bearing pad mounted to a base, said polymer bearing pad comprising an outer surface, at least one recess for receiving lubricating fluid from at least one passage of said base and distributing said lubricating fluid to said outer surface and mounting means for securely mounting said polymer bearing pad to said base, said base also comprising at least one lubricating fluid supply port in fluid communication with said at least one passage, wherein said base is fixedly mounted to said frame.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Preferably, said mounting means comprises a mounting portion extending from said polymer bearing pad. More preferably, said mounting portion comprises a protrusion from a mounting surface opposite to said outer surface for engaging a flange of said base. In one preferred form, said mounting surface comprises an inner surface of said polymer bearing pad. In another preferred form, said inner surface is the underside of said polymer bearing pad.

Alternatively or additionally, said mounting means comprises at least one opening for receiving at least one fastener for mounting said polymer bearing pad to said base. More preferably, said at least one recess has a locking tab for retaining a head portion of said fastener within said at least one recess.

Preferably, said polymer bearing pad substantially covers an outer surface of said base to create a fluid seal between said polymer bearing pad and said base.

Preferably, said at least one recess comprises at least one interconnecting passage for fluidly connecting said at least one recess to said base.

Preferably, said outer surface is partially curved. Alternatively, said outer surface is substantially planar.

Preferably, said polymer bearing pad comprises a chamfer at an outer edge for retaining lubricating fluid at said outer edge and transferring said lubricating fluid to a journal. More preferably, said polymer bearing pad comprises two chamfers at opposing outer edges. In one preferred form, said chamfer is inclined approximately 0.01° to 89° from a tangent of an edge of said outer surface. In a particularly preferred form, said chamfer is inclined approximately 8° from said tangent.

Preferably, said chamfer has an outer edge that is displaced from a journal when said journal engages said polymer bearing pad.

Preferably, said polymer bearing pad comprises at least one complementary connecting portion for connecting said polymer bearing pad to an adjacent polymer bearing pad. In a particularly preferred form, said polymer pad has at least one lateral connecting portion for mutual engagement with a corresponding lateral connecting portion of said adjacent polymer bearing pad.

Preferably, said polymer bearing pad is made from any suitable polymer, including, but not limited to, polyetheretherketone (PEEK), PEEK composites, polyamide, polyamide composites, polyamide-imide and polyamide-imide composites. In one preferred form, the polymer pad is made of PEEK.

Preferably, said at least one recess comprises at least one interconnecting passage for fluidly connecting said at least one recess to said at least one passage.

Preferably, said base comprises at least one flange for engagement with said mounting portion to securely mount said polymer bearing pad to said base. More preferably, said at least one flange is located at an outer edge of said base. In one preferred form, said base comprises two of said flanges located at opposing outer edges of said base.

Preferably, said fluid bearing comprises at least one fastener for mounting said polymer bearing pad to said base. More preferably, said at least one fastener comprises a bore for conveying lubricating fluid from said at least one passage to said at least one recess. In one preferred form, said bore conveys lubricating fluid from said at least one passage to said interconnecting passage.

Preferably, said fluid bearing is a hydrostatic bearing. More preferably, said outer surface is partially curved such that said fluid bearing acts as a radial hydrostatic bearing. In one preferred form, said fluid bearing is a self-aligning radial hydrostatic bearing. In another preferred form, said fluid bearing is a fixedly mounted radial hydrostatic bearing. In a further preferred form, said fluid bearing is a hydrostatic slipper bearing.

Alternatively, said outer surface is substantially planar such that said fluid bearing acts as an axial bearing. In one preferred form, said fluid bearing is a self-aligning axial hydrostatic bearing. In another preferred form, said fluid bearing is a fixedly mounted axial hydrostatic bearing.

Preferably, said at least one fastener is partially received in said at least one passage. Preferably, said at least one fastener comprises a head portion for engagement with said at least one recess. More preferably, said at least one recess has a locking tab for retaining said head portion within said at least one recess. In one preferred form, said head portion is tapered to facilitate retention of said at least one fastener within said at least one recess by said locking tab.

Alternatively, said fluid bearing comprises a plug for engagement with said head portion and said at least one recess to retain said at least one fastener. In one preferred form, said at least one fastener is countersunk into said at least one recess.

Preferably, said at least one fastener is substantially retained within said at least one recess by a locking element. More preferably, said locking element comprises, but is not limited to, a liquid thread locker, a Scotch key, a non-loosening thread, a non-loosening washer or similar locking device.

Preferably, the fluid bearing comprises a plurality of said polymer pads, wherein said outer surfaces of said polymer pads form a substantially uniform bearing surface for said journal.

Preferably, said polymer pads are connected together. More preferably, each of said polymer pads has at least one complementary connecting portion for connecting said polymer pad to an adjacent polymer pad. In one preferred form, each of said polymer pads has at least one lateral connecting portion for mutual engagement with a corresponding lateral connecting portion of an adjacent polymer bearing pad.

Preferably, said base further comprises a first surface, a second surface, a plurality of said at least one passages and a plurality of said at least one lubricating fluid supply ports, wherein said at least one passages are in fluid communication with said at least one lubricating fluid supply ports, said first surface and said second surface, and a first of said polymer bearing pads is mountable to said first surface and a second of said polymer bearing pads is mountable to said second surface, wherein said first polymer bearing pad comprises a first outer surface and at least one recess for receiving lubricating fluid from at least one of said plurality of passages and distributing said lubricating fluid to said first outer surface, and said second polymer bearing pad comprises a second outer surface and at least one recess for receiving lubricating fluid at least one of said plurality of passages and distributing said lubricating fluid to said second outer surface.

Preferably, said first outer surface is partially curved such that said first polymer bearing pad acts as a radial hydrostatic bearing. In one preferred form, said first polymer bearing pad acts as a self-aligning radial hydrostatic bearing.

Preferably, said second outer surface is substantially planar such that said second polymer bearing pad acts as an axial bearing. In one preferred form, said second polymer bearing pad acts as a fixedly mounted axial hydrostatic bearing.

Preferably, said first surface is orthogonal to said second surface. In one preferred form, said first surface is an upper or top surface of said base and said second surface is a side surface of said base.

There is disclosed a method of making a polymer bearing pad for a fluid bearing, comprising forming a polymer pad having an outer surface, forming at least one recess in said polymer pad for receiving lubricating fluid from a base of said fluid bearing and distributing said lubricating fluid to said outer surface, and forming a mounting means on said polymer pad for securely mounting said polymer pad to said base.

Preferably, said mounting means forming step comprises forming a mounting portion to extend from said polymer pad. More preferably, said mounting portion forming step comprises machining said polymer pad to form said mounting portion. Alternatively, said mounting portion forming step comprises placing said polymer pad in a mould to form said mounting portion. Alternatively or additionally, said mounting means forming step comprises forming an opening in said at least one recess for receiving at least one fastener. More preferably, said opening is drilled, punched, cut or machined into said at least one recess.

Preferably, said at least one recess forming step comprises machining said at least one recess in said polymer pad. More preferably, said at least one recess forming step comprises machining at least one interconnecting passage to interconnect said at least one recess to said base.

Preferably, said method further comprises chamfering an outer edge of said polymer pad. In one preferred form, said chamfering step comprises chamfering two opposing outer edges of said polymer pad.

Also disclosed is a method of making a fluid bearing for a journal, comprising the steps of:

providing a base having at least one lubricating fluid supply port and at least one passage in fluid communication with said at least one lubricating fluid supply port;

forming a polymer pad having an outer surface and at least one recess for receiving lubricating fluid from said at least one passage and distributing said lubricating fluid to said outer surface, and mounting said polymer bearing pad to said base.

Preferably, said method comprises each of the preferred steps in the abovementioned third aspect of the invention. In this aspect, said forming step further comprises machining at least one interconnecting passage to interconnect said at least one recess to said passage.

Preferably, said mounting step comprising mechanically fastening said polymer bearing pad to said base. More preferably, the method further comprises the steps of using a fastener to mechanically fasten said polymer bearing pad to said base and forming a bore in said at least one fastener for conveying lubricating fluid from said at least one passage to said at least one recess. In one preferred form, said mounting step comprises bolting said polymer pads to said base.

Preferably, where there are a plurality of said polymer pads, said method further comprises the step of connecting said polymer bearing pads such that said outer surfaces of said polymer bearing pads form a substantially uniform bearing surface for said journal. More preferably, said forming step further comprises the step of forming at least one connecting portion in each said polymer bearing pad for connecting said polymer pad to an adjacent polymer bearing pad. In one preferred form, said forming step comprises forming at least one lateral connecting portion in each said polymer bearing pad for mutual engagement with a corresponding lateral connecting portion of an adjacent polymer bearing pad.

Preferably, said method further comprises selecting one or more polymer bearing pads for mounting at the outer edges of said base and chamfering an outer edge of each selected polymer bearing pad.

Where said fluid bearing is a radial hydrostatic bearing, each of said polymer pads have curved outer surfaces such that said outer surfaces define a substantially curved uniform bearing surface.

Also further disclosed is a fluid bearing for a journal, comprising:

a base having at least one lubricating fluid supply port, at least one passage in fluid communication with said at least one lubricating fluid supply port, and a polymer bearing pad having at least one recess for receiving lubricating fluid from said at least one passage and distributing said lubricating fluid to an outer surface of said bearing pad, said polymer bearing pad being mountable to said base and further comprising a chamfer at an outer edge for retaining said lubricating fluid thereon and transferring said lubricating fluid to said journal.

Preferably, said chamfer is inclined approximately 0.01° to 89° from a tangent of an edge of said outer surface. In one preferred form, said chamfer is inclined approximately 8° from a tangent of an edge of said outer surface.

Preferably, said chamfer has an outer edge that is displaced from said journal when said journal engages said polymer bearing pad.

Preferably, the polymer bearing pad is composed of a polymer material that includes, but is not limited to, PEEK, PEEK composites, polyamide, polyamide composites, polyamide-imide and polyamide-imide composites. In one preferred form, the bearing pad is composed of polyetheretherketone (PEEK).

Preferably, said fluid bearing is a hydrostatic bearing.

According to a third aspect of the invention, there is provided a multidirectional fluid bearing for a journal, comprising:

a base having a first surface orthogonal to a second surface, at least one lubricating fluid supply port and a plurality of passages in fluid communication with said at least one lubricating fluid supply port, said first surface and said second surface, a first polymer pad mountable to said first surface, said polymer pad having a first outer surface and at least one recess for receiving lubricating fluid from at least one of said plurality of passages and distributing said lubricating fluid to said first outer surface, and a second polymer pad mountable to said second surface, said polymer pad having a second outer surface and at least one recess for receiving lubricating fluid at least one of said plurality of passages and distributing said lubricating fluid to said second outer surface.

Preferably, said first polymer bearing pad substantially covers said first surface and said second polymer bearing pad substantially covers said second surface to respectively create fluid seals between said first and second polymer bearing pads and said base.

Preferably, at least one of said first and second polymer bearing pads comprises a chamfer at an outer edge for retaining lubricating fluid at said outer edge and transferring said lubricating fluid to a journal. More preferably, said chamfer has an outer edge that is displaced from a journal when said journal engages said at least one polymer bearing pad.

Preferably, at least one of said first and second polymer bearing pads comprises at least one opening for receiving at least one fastener for mounting said at least one polymer bearing pad to said base. More preferably, said at least one recess comprises a locking tab for retaining a head portion of said fastener within said at least one recess. In one preferred form, said head portion is tapered to facilitate retention of said at least one fastener within said at least one recess by said locking tab.

Preferably, said at least one fastener comprises a bore for conveying lubricating fluid from said at least one passage to said at least one recess, said at least one fastener being partially received in said at least one passage.

Preferably, at least one of said first and second polymer bearing pads comprises at least one opening for receiving at least one fastener for mounting said at least one polymer bearing pad to said base. Preferably, said at least one polymer bearing pad comprises a locking element for retaining said at least one fastener within said at least one recess.

Preferably, there is a plurality of at least one of said first and second polymer bearing pads, wherein said respective outer surfaces of said plurality of at least one of said first and second polymer bearing pads form a substantially uniform bearing surface for said journal. More preferably, each of said plurality of at least one of said first and second polymer bearing pads comprises at least one lateral connecting portion for mutual engagement with a corresponding lateral connecting portion of an adjacent polymer bearing pad.

Preferably, said first outer surface is partially curved such that said first polymer pad acts as a radial hydrostatic bearing. In one preferred form, said first polymer pad acts as a self-aligning radial hydrostatic bearing.

Preferably, said second outer surface is substantially planar such that said second polymer pad acts as an axial bearing. In one preferred form, said second polymer pad acts as a fixedly mounted axial hydrostatic bearing.

Preferably, said first surface is an upper or top surface of said base and said second surface is a side surface of said base.

Preferably, said first polymer bearing pad and said second polymer bearing pad have the preferred features of the abovementioned aspects of the invention.

Preferably, said lubricating fluid includes oil or water.

BRIEF DESCRIPTION OF THE SEVERAL VIEWS OF THE DRAWINGS

Preferred embodiments of the invention will now be described, by way of example only, with reference to the accompanying drawings in which:

FIG. 4 is a schematic plan view of a radial hydrostatic bearing for the bearing assembly of FIG. 3;

FIG. 5 is a cross-sectional view of the radial hydrostatic bearing along section A-A of FIG. 4;

FIG. 5A is a expanded partial cross-sectional view of the chamfer of the radial hydrostatic bearing of FIG. 4;

FIGS. 11 and 11A are schematic partial views of a fastener for use with the hydrostatic bearings of FIGS. 4 to 10;

FIGS. 12 and 12A are schematic partial views of an alternative fastener for use with the hydrostatic bearings of FIGS. 4 to 10;

FIGS. 16 and 16A are a schematic plan and cross-sectional views, respectively, of a hydrostatic bearing manufactured in accordance with a further embodiment of the invention;

FIGS. 17 and 17A are a schematic plan and cross-sectional views, respectively, of a hydrostatic bearing manufactured in accordance with a further embodiment of the invention;

FIGS. 18 and 18A are a schematic plan and cross-sectional views, respectively, of a hydrostatic bearing manufactured in accordance with a further embodiment of the invention;

DETAILED DESCRIPTION OF THE INVENTION

Figure 1:
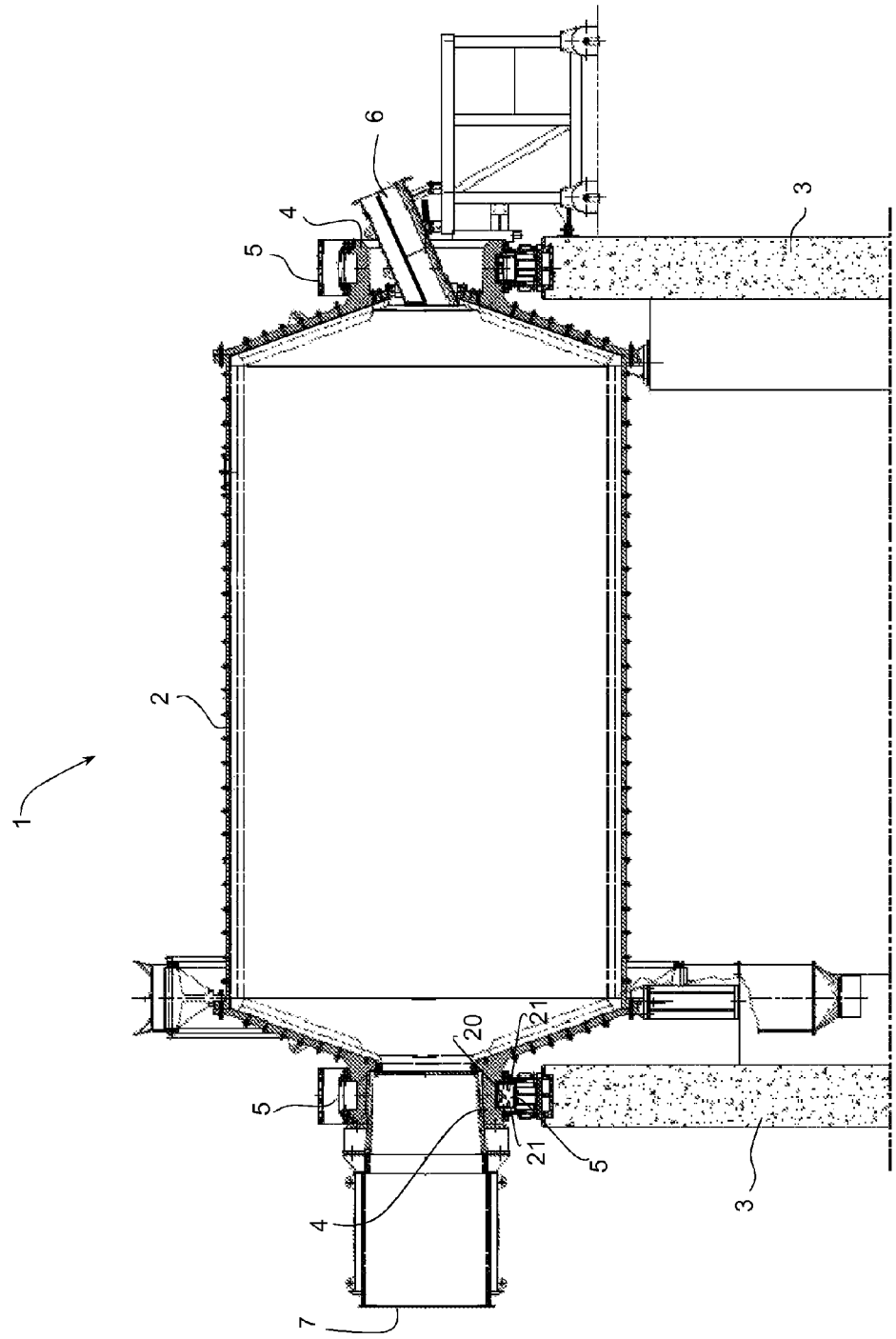
FIG. 1 is a cross-sectional side view of a grinding mill for receiving a hydrostatic bearing according to a first embodiment of the invention.

Referring to FIG. 1, a typical grinding mill 1 comprises a milling chamber or body 2 rotatably mounted on supports 3 via journal shafts 4 and bearing assemblies 5. The mill body 2 has an inlet 6 for introducing a charge for grinding and a discharge outlet 7 for removing the processed charge from the mill 1.

Figure 2:
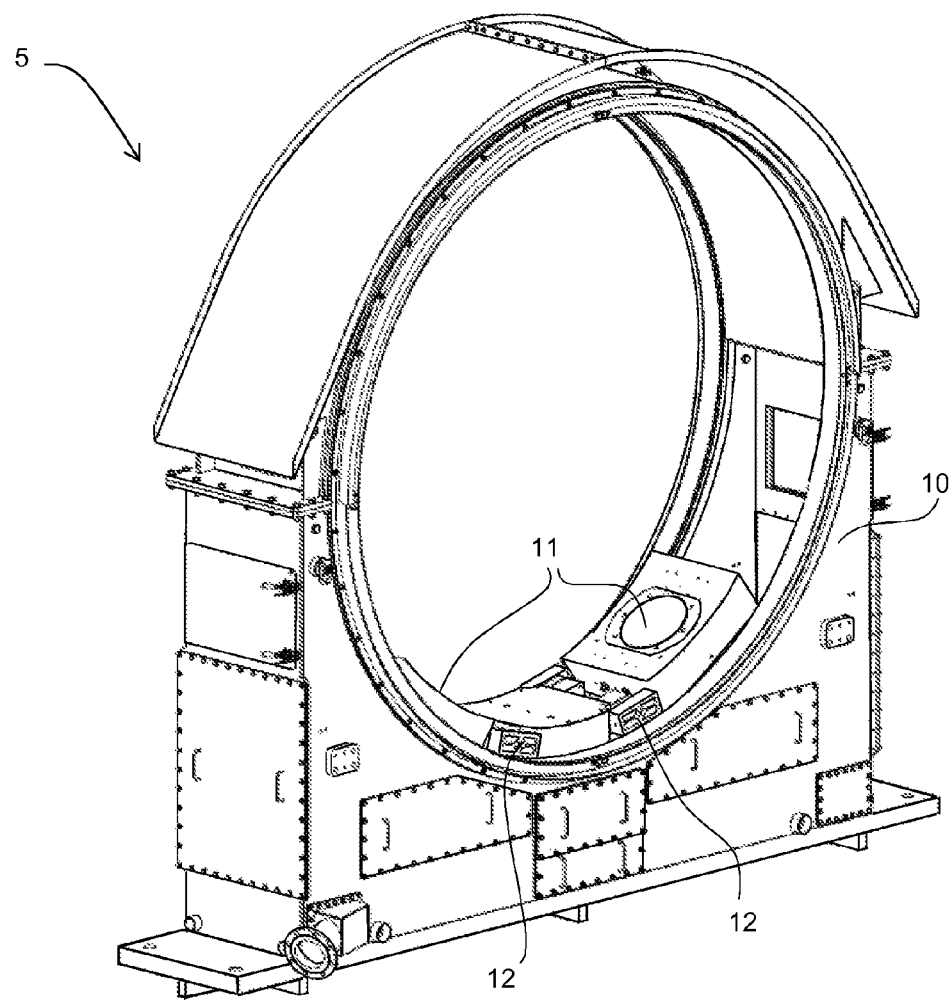
FIG. 2 is a perspective view of a bearing assembly in the mill of FIG. 1.
Figure 3:
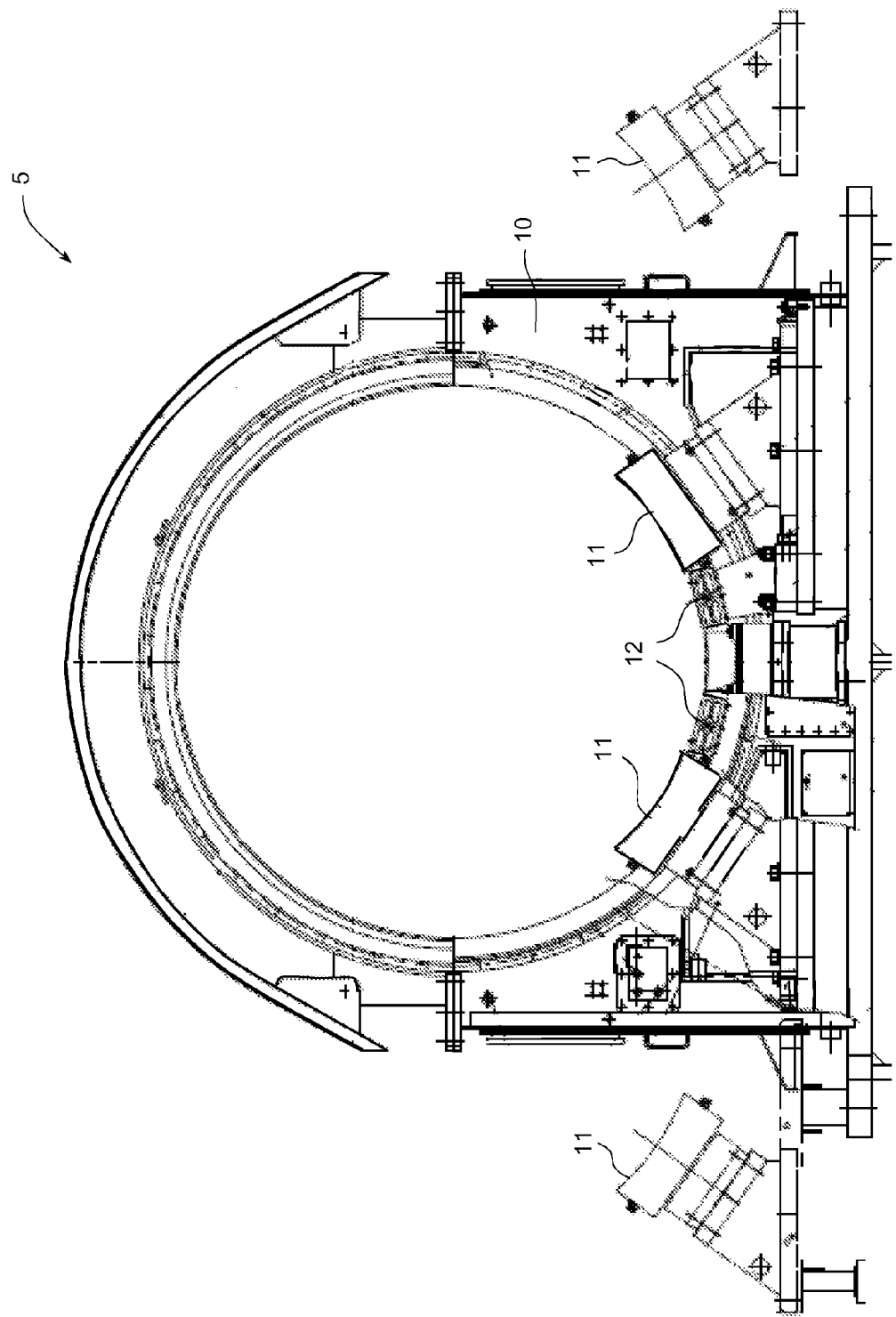
FIG. 3 is a front view of the bearing assembly of FIG. 2.
Figure 6:
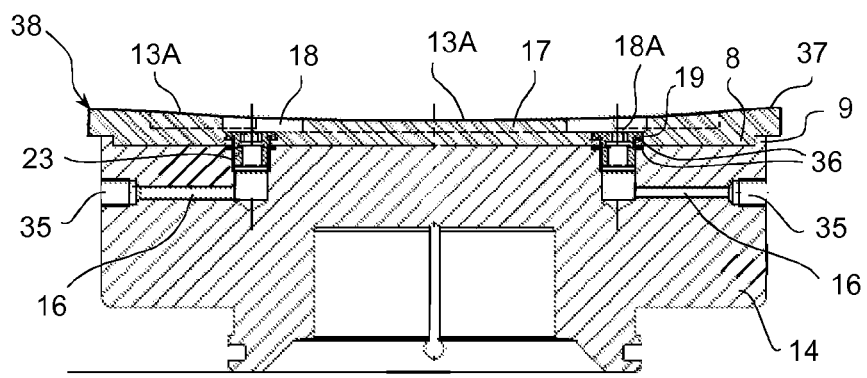
FIG. 6 is a cross-sectional view of the radial hydrostatic bearing taken along section B-B of FIG. 4.
Figure 7:
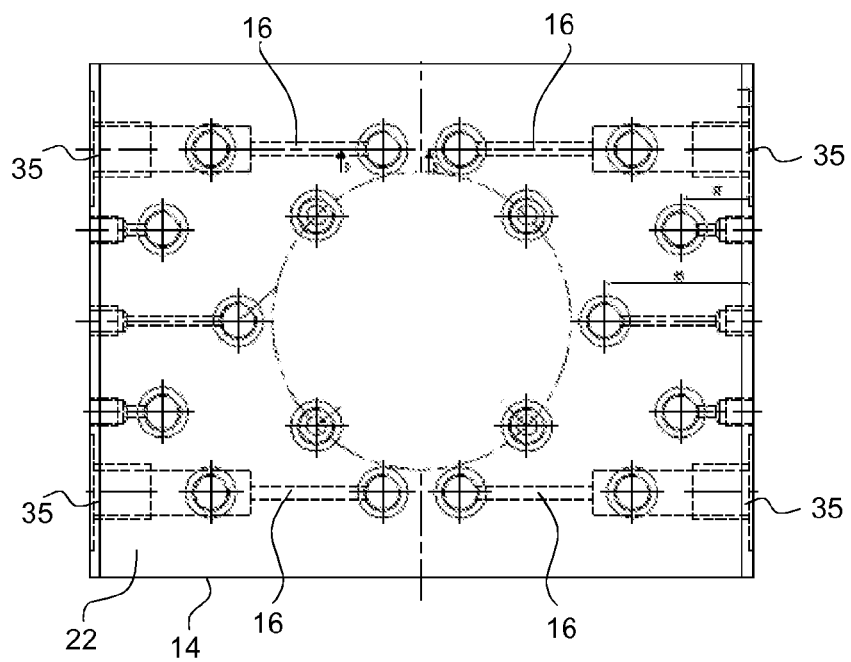
FIG. 7 is a schematic plan view of the base of the radial hydrostatic bearing of FIG. 4.
Figure 8:
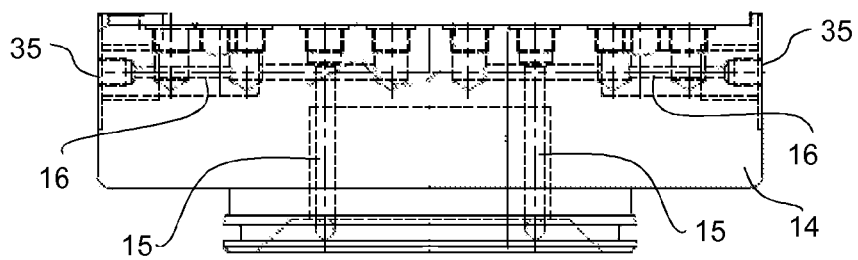
FIG. 8 is a schematic cross-sectional view of the base of FIG. 7.

As best shown in FIGS. 2 and 3, each bearing assembly 5 has a frame 10 and a plurality of fluid bearings in the form of radial hydrostatic bearings 11 and axial hydrostatic bearings 12, which are designed to transport a lubricating fluid in the form of a high pressure oil to an outer surface 13A, 13B of each bearing 11, 12.

Referring to FIGS. 4 to 8, where corresponding features have been given the same reference numerals, each radial hydrostatic bearing 11 comprise a base 14 having at least one lubricating fluid supply port in the form of an oil supply port 15 and at least one passage in the form of an oil gallery 16 in fluid communication with the oil supply port 15. The hydrostatic bearings 11, 12 are self-aligning in that the hydrostatic bearings self-adjust to any changes in the angular position of the journals 4 during operation of the mill 1. This is typically achieved by having the base 14 mounted on a spherical seat (not shown) to permit self-adjustment to any angular movement of the journals 4. The base 14 is composed of cast iron, but can be made of any other suitable metal or material.

A polymer pad 17 is mountable to the base 14 of each radial hydrostatic bearing 11 via a mounting portion 8 extending from the polymer pad. In this embodiment, the mounting portion 8 is a protrusion extending from a mounting surface opposite the outer surface 13A to engage flanges 9 located at respective outer edges or sides of the base 14. Generally, the mounting surface will be an inner surface or the underside of the polymer pad 17, but in other embodiments can be located elsewhere. Likewise, the flanges 9 need not be located at opposing outer edges of the base 14, but can be arranged in any manner that would act to hold captive the bearing pad 17, such as the flanges 9 being located closer to the centre of the base 14 rather than at the outer edges or the flanges 9 being opposed herringbone flanges positioned on the base 14 between which the mounting portions 8 are constrained.

The polymer bearing pad 17 has at least one recess 18 for receiving oil from the oil gallery 16 and distributing it to the outer surface 13A to act as a lubricating fluid between the radial hydrostatic bearing 11 and the journal shafts 4. In the preferred embodiment, the recess 18 is fluidly connected to the oil gallery 16 via an interconnecting passage 19. Also, the radial hydrostatic bearings 11 have a plurality of oil supply ports 15, oil galleries 16, recesses 18 and interconnecting passages 19.

The outer surface 13A of the polymer pad 17 of the radial hydrostatic bearings 11, 12 is curved to receive the curved bearing surface 20 of the journal 4, as best shown in FIGS. 1, 9, 11 and 11A. Thus, the outer surface 13A of the polymer pad 17 forms a bearing surface, and hence the polymer pad is a bearing pad for the bearings 11 when assembled with the base 14.

Figure 9:
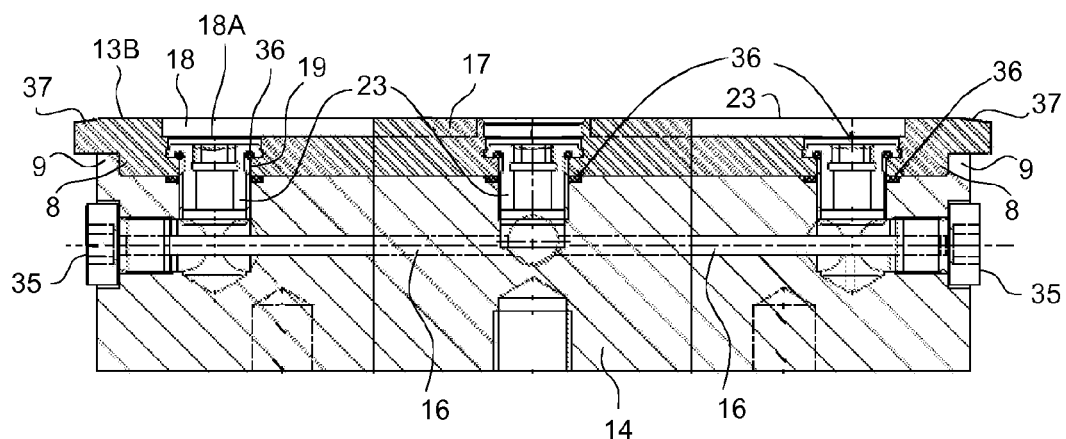
FIG. 9 is a schematic cross-sectional view of an axial hydrostatic bearing for the bearing assembly of FIG. 3.
Figure 10:
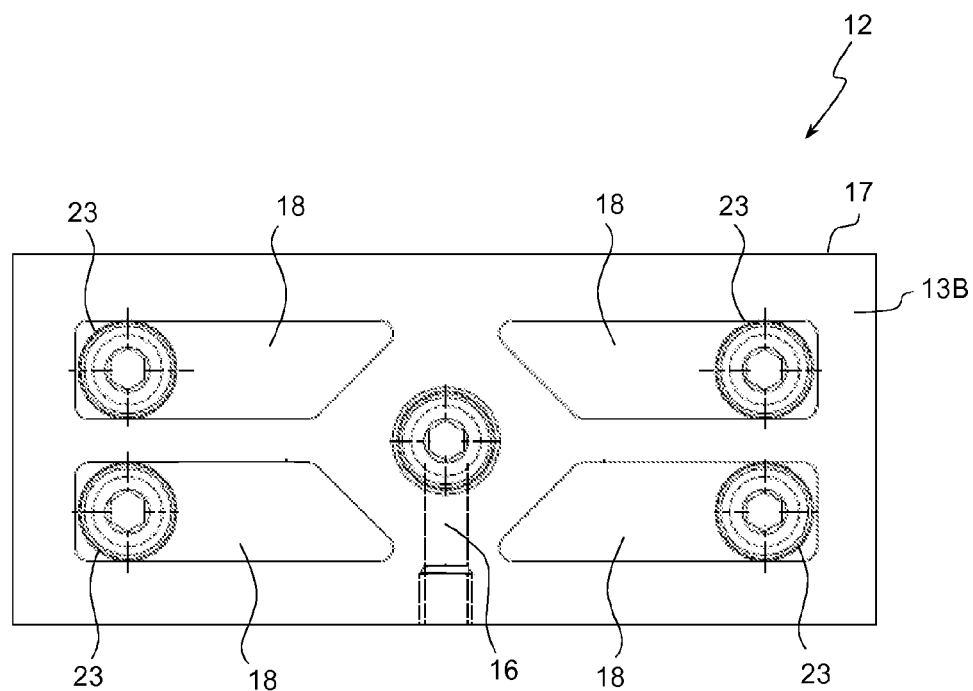
FIG. 10 is a schematic plan view of the axial hydrostatic bearing of FIG. 9.

Referring to FIGS. 9 and 10, where corresponding features have been given the same reference numerals, each of the axial hydrostatic bearings 12 also comprises a base 14 having at least one lubricating fluid supply port in the form of an oil supply port 15 and at least one passage in the form of an oil gallery 16 in fluid communication with the oil supply port 15. A polymer pad 17 is mountable to the base 14 of each axial hydrostatic bearing 12, the polymer pad 17 having at least one recess 18 for receiving oil from the oil gallery 16 and distributing it to the outer surface 13B to act as a lubricating fluid between the axial hydrostatic bearings 12 and the journal shafts 4. Again, in the preferred embodiment, the recess 18 is fluidly connected to the oil gallery 16 via an interconnecting passage 19 in the polymer pad 17. In addition, the axial hydrostatic bearings 12 have a plurality of oil galleries 16 in the base 14, and recesses 18 and interconnecting passages 19 in the polymer pad 17.

Also, the outer surface 13B of the axial hydrostatic bearing 12 is substantially planar as it receives the substantially planar end surface 21 of the journal 4, as best shown in FIG. 1. Similarly to outer surface 13A, the outer surface 13B of the polymer pad 17 also forms a bearing surface, and hence the polymer pad is a bearing pad for the bearings 12 when assembled with the base 14.

In both the radial and axial hydrostatic bearings 11, 12, the polymer pad 17 substantially covers the entire outer surface 22 of the base 14 to form a substantially fluid impermeable seal between the base and the polymer pad. Also, the polymer pad 17 is mounted to the base 14 using at least one fastener in the form of bolts 23, as best shown in FIGS. 5 and 9. The fastening system for both the radial hydrostatic bearing 11 and the axial hydrostatic bearing 12 is described in more detail below.

The fastening system for mounting the polymer pad 17 to the bases 14 of the radial and axial hydrostatic bearings 11, 12 is illustrated in more detail in FIGS. 11 and 11A, where corresponding features have been given the same reference numerals. The fastening system comprises one of more bolts 23 that are inserted into corresponding openings 18A that are in fluid communication with the oil galleries 16. Each bolt 23 has a bore in the form of through bore 24 for conveying oil from the oil galleries 16 to the recesses 18 via a discharge port 25, as best shown in FIG. 11. Thus, there is no need to provide separate oil passages between the oil galleries 16 in the base 14 and the recesses 18 in the polymer pad 17, unlike conventional bronze/white metal hydrostatic bearings. This reduces the complexity and cost in the manufacture of the hydrostatic polymer bearings. It will be appreciated that not all the bolts necessarily will have a bore as sometimes more fasteners are required to mount the polymer bearing pad 17 than the number of oil passages to connect the oil galleries 16 to the recesses 18.

The bolt 23 is inserted into the oil gallery 16 via the opening 18A and has a head portion 26 for engagement with a seat 27 of the recess 18, as best shown in FIG. 11A. The bolt 23 engages the recess 18 to ensure that, in the event of the bolt becoming loose, it is held captive within the recess 18. This prevents any loose bolts 23 coming into contact with and damaging the journal 4. A locking tab 28 is also provided for retaining the head portion 26 within the recess 18. In addition, the head portion 26 has a tapered portion 29 to facilitate retention of the bolt 23 within the recess 18 by the locking tab 28.

Also, the mounting portion 8 of the polymer pad 17 engages the flanges 9 of the base 14 to help lock the polymer pad in place. This ensures that frictional loads generated during the rotation of the journal 4 do not forcibly remove or "wipe" the polymer pad 17 from the base 14, even where the bolts 23 become loose, such that the mounting portion 8 and flanges 9 in effect replace the restraint of the bolts 23 against frictional related lateral loads. This makes for a very simple but reliable arrangement, with a level of redundancy to ensure correct operation even if the bolts 23 become loose.

Moreover, hydrostatic pressure acts between the journal 4 and the polymer bearing pad 17, while there is atmospheric pressure between the polymer bearing pad and the base 14. This pressure difference during operation of the fluid bearing 11, 12, together with the engagement of the mounting portion 8 and the flange or shoulder 9, acts to hold the polymer bearing pad 17 in place. In practice, the fastening system primarily assists in the initial installation of the polymer bearing pad 17 since there is no pressure between polymer bearing pad and the journal 4. This means that in the event bolts 23 are loose the polymer bearing pad 17 would be free to move or "float" until the hydrostatic pressure at the journal 4 is greater than the atmospheric pressure between polymer bearing pad and the base 14.

An alternative fastening arrangement is illustrated in FIG. 12, where corresponding features have been given the same reference numerals. The fastener takes the form of a countersunk screw 30 having a tapered head portion 31 for engagement with a seat 27 recessed in the polymer pad 17. Due to the screw 30 being countersunk into the base 14 and the polymer pad 17, the head portion 31 is tapered in the reverse direction to the taper of the head portion 26 of the bolt 23. To prevent any screw 30 becoming loose and coming into contact with the journal 4, a plug 32 is used to engage the head portion 31 and a locking tab 28 is used to retain the plug 32, and thus the screw 30, within the seat 27. Oil is delivered to the outer surface 13 through a separate recess in the form of a hole 33 that is connected to a bore 34 located over the same position as the oil gallery 16 in the base 14 below, as best shown in FIG. 12A.

In either fastening arrangement, separate O-rings 36 are fitted to the base 14 to provide a fluid seal preventing oil leaking in between the polymer pad 17 and the base, as best shown in FIGS. 9, 11, 11A and 12A. The thread into which the bolts 23 also assists in forming a fluid seal between the polymer bearing pad 17 and the base 14. The threads 35 act as plugs to close off holes that are required for machining the oil galleries 16 that direct lubricating fluid into the corner pockets from the central pocket.

In operation, the radial and axial hydrostatic bearings 11, 12 are installed in the bearing assembly 5 in the positions generally shown in FIG. 3 in a manner readily understood by a person skilled in the art. The mill body 2 is then mounted on the bearing assembly 5 via the journals 4. An oil supply system is fluidly connected to the oil supply ports 15 in the base 14 of each radial and axial hydrostatic bearing 11, 12. Typically, the oil is positively pumped to the oil supply ports 15. However, in some variants, the oil need not be supplied by positive displacement pump. In either case, high pressure oil is conveyed from the oil supply ports 15 through the passages 16, bores 23 and interconnecting passages 19 to the recesses 18 and discharge ports 25 and up to the outer surfaces 13A, 13B, as best shown by arrow 39 in FIG. 11. The oil collects on the outer surfaces 13A, 13B to create an oil film and lubricate the bearing surfaces 20, 21 of the journals 4.

Where there is a loss of oil due to a failure in the oil supply system, the polymer pad 17 absorbs most, if not all, of the detrimental effects so any damage is limited to the polymer pad 17 rather than the bearing surfaces 20, 21 of the journal 4 or the base 14. Thus, the base 14 (and its oil galleries 16 and oil supply ports 15) are protected from damage and any damage is suffered by the polymer pad 17. Thus, by having the polymer pad 17 provided with recesses 18 for distributing oil to the outer surface 13, rather than the base 14, the polymer pad can be easily replaced in the event of damage without having to repair the entire bearing. In addition, this advantage is further facilitated by using mechanical fasteners described above to mount the polymer pad 17. Thus, a damaged polymer pad 17 can be removed simply by removing the fasteners 23, 30, enabling easy replacement of the polymer pads 17. Thus, maintenance and operational costs of the mill 1 are reduced, increasing the efficiency of the mill.

It has also been discovered that providing a polymer pad for the hydrostatic bearings 11, 12 confer numerous advantages over existing hydrostatic bearings with white metal/bronze bearing pads, as follows:

(1) It has been discovered that the polymer pad 17 behaves similar to white metal/bronze pads, but is able to self-mould to the journal 4. That is, the polymer pad 17 is able to modify its outer surface 13A, 13B to accommodate circumferential surface imperfections on the bearing surfaces 20, 21 of the journal 4. This reduces or eliminates the need for tight machining tolerances required for bronze bearings, and can subsequently reduce the associated machining costs. Hence, there is a reduced manufacturing cost for the hydrostatic bearings by using a polymer pad.

(2) The polymer bearing pads 17 enable reduced lubrication rates to be used over traditional bronze bearing pads due to the running in characteristics of polymer material, thus conserving lubricating fluid. However, where necessary or desirable, the polymer pads 17 operate equally well at the same lubrication rates used for conventional bronze/white metal bearing pads.

(3) The hydrostatic polymer bearing pads 17 have a lower modulus of elasticity, and thus are able to create a "hovercraft" type cushion around the perimeter of the polymer pad. This acts to accommodate journal imperfections whilst maintaining pressure, much like the cushioning effect produced when a hovercraft moves over bumpy ground.

(4) The hydrostatic polymer bearing pads 17 are much more tolerant than traditional materials to a loss of oil to the bearing 11,12, to contact between journal 4 and outer surface 13A, 13B, and to deformations in the journal bearing surfaces 20, 21. Thus, a loss of oil film due to oil viscosity being too low (from such causes as a high temperature or oil degradation) can be more tolerably managed by the polymer pad 17.

(5) The polymer is elastic, unlike bronze, and is significantly softer than bronze. Thus, the elastic nature of the polymer pads 17 dampen excessive forces that are applied to the hydrostatic bearings 11, 12. For example, where there is a loss of oil through a shock load placed on the hydrostatic bearing 11, 12 there is little or no risk of damage to the metal journal 4 because the polymer pad 17 dampens the shock to some extent and any damage sustained is suffered by the polymer pad rather than the journal. By way of contrast, with white metal/bronze bearings there is a significant risk of damage to metal journals, resulting in on-site machining and costly stoppages. This advantage of the elasticity of the polymer bearing pads also extends to white metal bearing pads, which are brittle and so are more easily damaged when subjected to typical shock loads.

(6) Any contaminants in the oil that would normally damage the bearing surfaces of the journal 4 or a standard bearing pad tend to be embedded into the polymer pad 17 without adversely affecting operation of the hydrostatic bearing 11, 12.

(7) The self-moulding property of the polymer pads 17 means that the outer surfaces 13A, 13B of the polymer pads tend to conform to the profile of the bearing surface 21 of the journal 4 that it is running against. As a consequence, the polymer pads 17 (and hence bearing 11) do not necessarily require a self-alignment mechanism (such as a spherical seat) within certain limits, unlike conventional bearings. It is also contemplated that the self-moulding property also permits the design and installation of hydrostatic bearings that ordinarily would be outside of the capacity of conventional bearings, since the polymer pad 17 can provide some degree of self-alignment in addition to a conventional self-alignment mechanism.

These advantages of the polymer pad 17 means that the hydrostatic bearings can be operated at lower oil film thicknesses. This has a flow on effect, permitting the use of smaller and cheaper lubrication systems, reducing power consumption and conserving the use of oil. Also, in the event of operational problems damage to the journals 4 and polymer bearing pads 17 is significantly reduced, increasing product life and reducing the frequency of maintenance and repair. Furthermore, any damage is limited to the polymer bearing pads 17 and does not adversely affect operation of the journal 4. Finally, the complex and expensive accumulator systems can be removed, saving installation costs and eliminating their associated maintenance costs.

Figure 13:
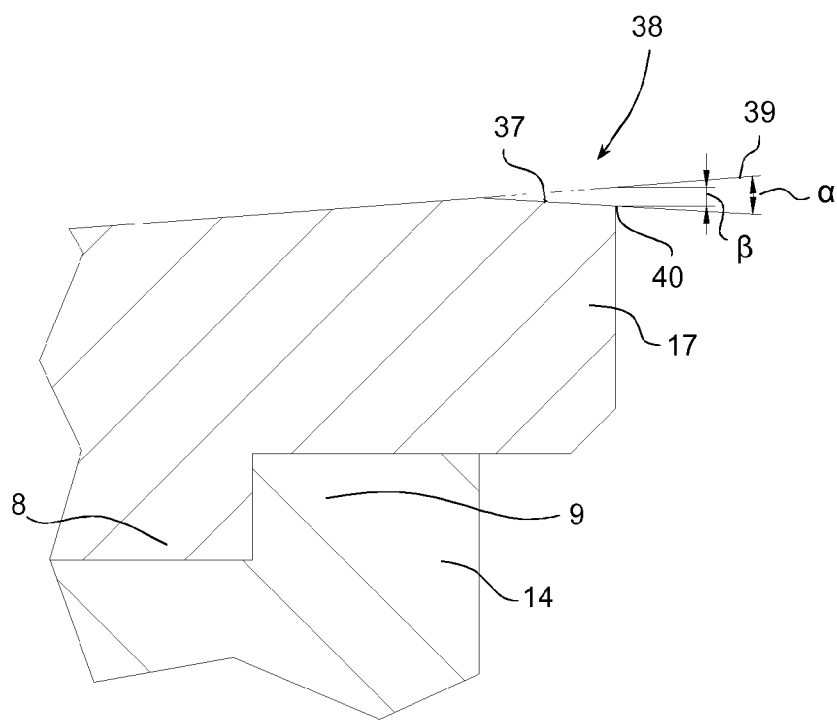
FIG. 13 is a schematic partial view of the chamfer of FIG. 5A.

Referring now to FIGS. 5A, 9 and 13, another aspect of the invention is described, where corresponding features have been given the same reference numerals. In this aspect of the invention, a chamfer is provided at an outer edge of a bearing pad for retaining lubricating fluid on the chamfer, thus enabling recycling of lubricating fluid in the bearing. In applying this aspect of the invention to both the radial and axial hydrostatic bearings 11, 12, the polymer pad 17 has a chamfer 37 at both outer edges 38 for retaining oil on the chamfer, as best shown in FIGS. 5A, 9 and 13. The chamfer 37 creates a lead-in and lead-out for the oil, especially when residual oil on the outer surfaces 13A, 13B must be relied upon for lubrication in the event of an unexpected loss of normal oil supply to the bearings 11, 12. The chamfer 37 inhibits or prevents oil being wiped off the journal 4, as would occur with a bearing having a sharp straight edge.

Thus, the chamfer 37 helps to ensure that there is a residual amount of oil between the polymer pad 17 and the metal journal 4.

In a conventional bearing, the straight edge would wipe off oil from the journal and thus increase the loss of oil from the bearing. By way of contrast, in this aspect of the invention, the chamfer 37 provides a capture point for the oil that may be lost during operation. As the journal 4 rotates on the hydrostatic bearing 11, 12 the "lead-in" chamfer 37 enables the bearing surface 20 of the journal 4 to capture oil from the chamfer 37 and thus is lubricated before coming into contact with the outer surface 13A, 13B of the hydrostatic bearing. The inventors believe that the oil held by the "lead-in" chamfer 37 is recaptured by the journal 4 due to a hydrodynamic effect produced by its rotation. When the bearing surface 20 of the journal 4 leaves the outer surface 13A, 13B of the hydrostatic bearing, the "lead-out" chamfer 37 on the other side of the hydrostatic bearing 11, 12 feeds any discharging oil from the outer surface 13A, 13B onto the journal to provide a consistent oil thickness over the journal, thus maintaining its lubrication. The provision of chamfers 37 at each outer edge 38 enables the mill journal 4 to be operated in either rotational direction. As a consequence, the use of the chamfers 37 minimises the loss of oil and effectively removes the need to provide oil pressure accumulators with their associated high maintenance and installation costs. Therefore, the chamfers 37 provide the radial and axial hydrostatic bearings 11, 12 provide a cost effective solution and safety measure for the hydrostatic bearings.

The chamfer 37 is inclined approximately at an angle $\alpha$ to the outer surface 13A, 13B. In the case of the radial hydrostatic bearing 11, the angle $\alpha$ is defined relative to a tangent 39 from the curved outer surface 13A, as best shown in FIG. 13. In the case of the axial hydrostatic bearing 12, the angle $\alpha$ is defined relative to the horizontal plane of the planar outer surface 13B. In either case, the angle $\alpha$ is in the range of 0.01° to 89°, and is preferably 8°.

In addition, the chamfer 37 has an outer edge 40 that is displaced from the journal 4 when the journal engages the polymer pad 17. In both the radial and axial hydrostatic bearings 11, 12 the outer edge 40 of the chamfer 27 is displaced approximately 0.5 mm to 1.5 mm from the journal 4. The displacement $\beta$ is preferably displaced by approximately 0.85 mm from the journal 4.

It will be appreciated by a person skilled in the art that the chamfer 37 could also be applied to existing bronze/white metal hydrostatic bearings and is not limited to hydrostatic bearings having a polymer pad.

Figure 14:
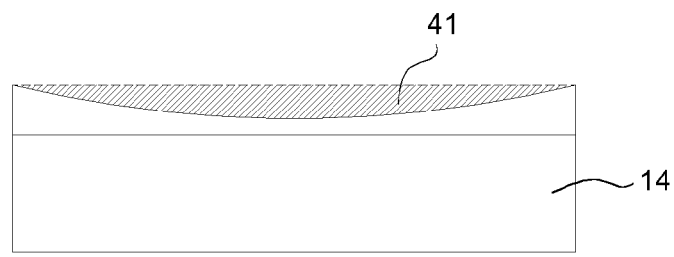
FIG. 14 is a schematic cross-sectional view of a prior art hydrostatic bearing.

Referring now to FIGS. 14 to 19, various methods of making the polymer pads 17 and the hydrostatic bearings 11, 12 of FIGS. 4 to 10 are illustrated, where corresponding features have been given the same reference numerals. As best shown in FIG. 14, manufacturing the curved surface for a radial hydrostatic bearing involves removing the hatched area 41 from the material. This waste material can be a significant, especially on larger bearings, and contributes to unnecessary additional manufacturing costs. Furthermore, the manufacturing process is not environmentally sustainable.

With the hydrostatic bearings of FIGS. 4 to 10, polymer material can be purchased "off the shelf" in sheet form and subsequently formed to produce the polymer pads 17. One method involves heating the polymer material to a holding temperature which does not melt the material, but the polymer retains some structural integrity while having some malleability or pliability to be able to be formed. There are various procedures that can be used to heat and form the polymer readily understood by the person skilled in the art.

In one example, the polymer can be placed in a shaped former or mould and lightly clamped. The former or mould is then heated to an intermediate temperature, removed from oven, fully clamped and returned to the oven. After heating to a holding temperature, the former is held for a set period of time, removed from oven and allowed to cool.

In another example, the polymer is placed in a shaped former and clamped using springs or a dead weight. The former is heated to the holding temperature and kept at this temperature for a set period of time. After being allowed to cool, the polymer is removed from the former.

In a further example, the polymer sheet is heated to the holding temperature for set period of time to ensure uniform heating of material. The polymer is then removed from the heat, immediately placed in cold former and pressed to profile. In the case of a radial hydrostatic bearing 11, the former also creates the curved outer surface 13A. After being allowed to cool, the polymer pad 17 is removed from the former.

After assuming the required shape for the hydrostatic bearing 11, 12, the recesses 18 and interconnecting passages 19 are machined into the outer surface 13A, 13B of the polymer pad 17. Also, the chamfer 37 is machined at the same time. The mounting portion 8 is machined, either before or after machining of the recesses 18, interconnecting passages 19 and the chamfer 37. Alternatively, the mounting portion 8 is formed during the initial moulding of the polymer sheet. The openings 18A can also be formed either during the initial moulding or by drilling, punching, cutting or machining the polymer pad 17. The machined polymer pad 17 is then mechanically mounted to the base 14 using the fastener systems described above to complete assembly of the hydrostatic bearing 11, 12.

Figure 15:
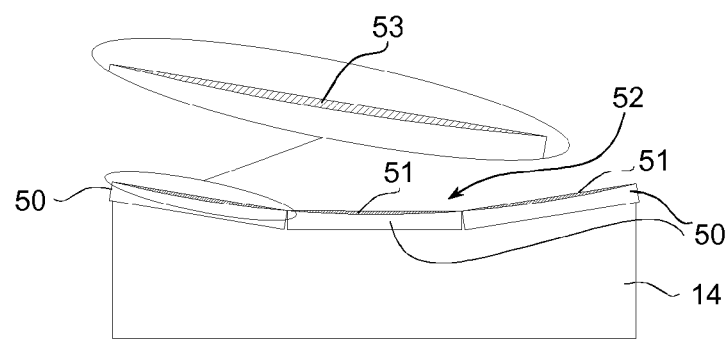
FIG. 15 is a schematic cross-sectional view of a hydrostatic bearing manufactured in accordance with another embodiment of the invention.

Referring now to FIGS. 15 to 16, another method of making the hydrostatic bearings is illustrated, where corresponding features have been given the same reference numerals. This method involves making a plurality of polymer pads in the form of slats 50 each having outer surfaces 51 that form a substantially uniform bearing surface 52 for the journal 4, as best shown in FIG. 15. The slats 50 are produced using the same heating and forming method described above, and then fastened to the base 14 using either of the fastener systems as described in relation to FIGS. 4 to 10. As best shown in FIG. 15, the resultant amount of removed material indicated by hatched area 53 is considerably less than the amount of material removed in a conventional bearing indicated by hatched area 41.

Also, the polymer pad 17 can be divided into any number of smaller polymer pads or slats 50 of any shape and/or size, as required. For example, there could be six polymeric slats 50 that are rectangular and uniform in shape but have differently shaped recesses, as best shown in FIGS. 16, 16A, 17 and 17A. Similarly, the polymeric slats 50 could be larger in size, as best shown in FIGS. 18 and 18A.

Figure 19:
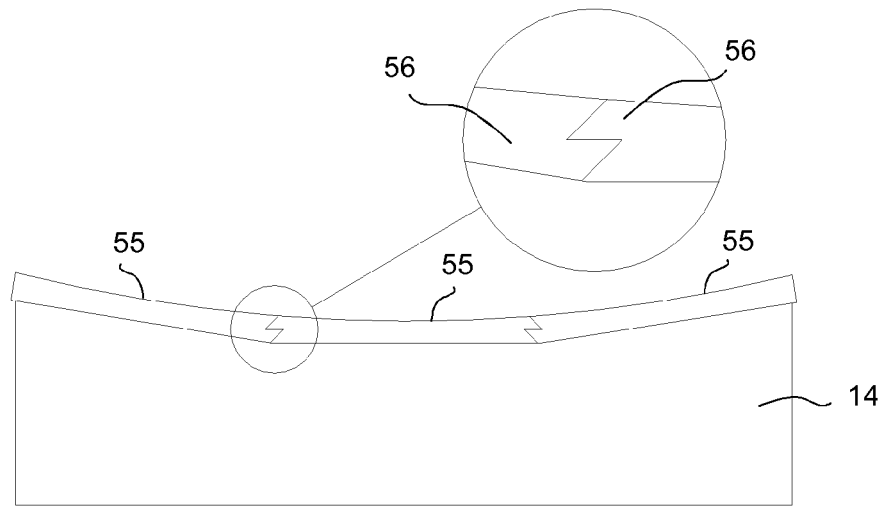
FIG. 19 is a schematic cross-sectional view of a hydrostatic bearing manufactured in accordance with a further embodiment of the invention.

In a further variation to this method, the polymeric slats 55 each have complementary connecting portions 56 to connect with an adjacent polymer pad 55, as best shown in FIG. 19. The complementary connecting portions in this variation take the form of teeth 56 that are splayed together so that the slats 55 form a complete polymer pad 17. The polymer pads 55 are then mounted to the base 14 using either of the fastener systems as described in relation to FIGS. 4 to 10. Once in position, glue may be applied at adjacent surfaces of the polymer slats and their teeth 56 to enhance sealing. Then, the polymer slats 55 are clamped and heated to cure the adhesive joint. The joint formed by the connecting teeth 56 is such that the weight of mill journal 4 on the polymeric slats 55 works to ensure the joint is always in compression. It has been found by testing such bearings that they are strong enough as a bearing surface for the journal 4. It will be appreciated that other profiles for the connecting portions 56 can be used, such as tabs and detents of any polygonal shape.

The inventors believe that segmenting the surface area of the polymer pad 17 into individual polymer pads or slats 50 reduces the amount of wastage involved with machining standard bearings, as indicated in area 41 of FIG. 14, and provides a suitable supplementary option to heating and forming the entire polymer pad 17 as described above.

Figure 22:
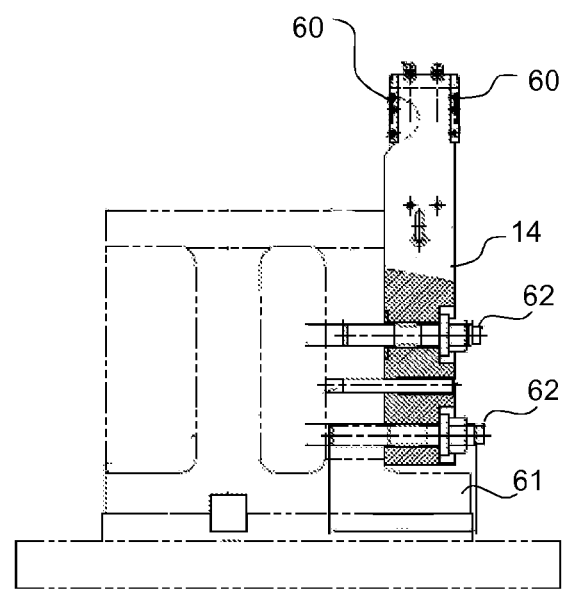
FIG. 22 is a schematic side view of the axial hydrostatic bearing of FIG. 20.
Figure 21:
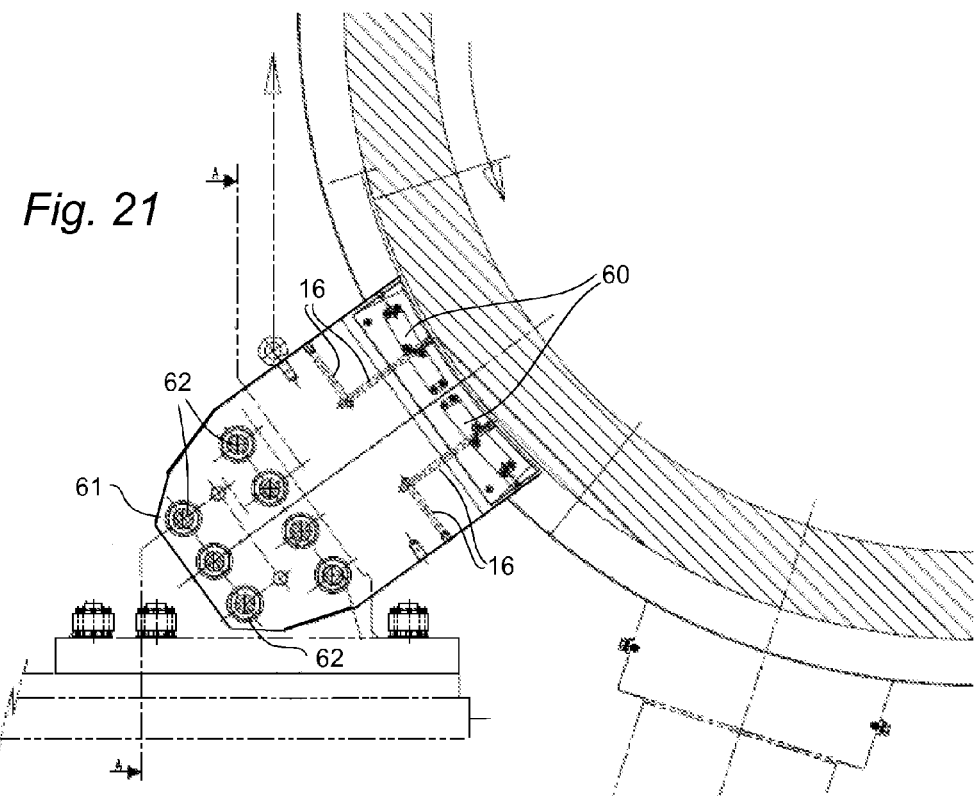
FIG. 21 is a schematic partial expanded view of the axial hydrostatic bearing of FIG. 20.
Figure 20:
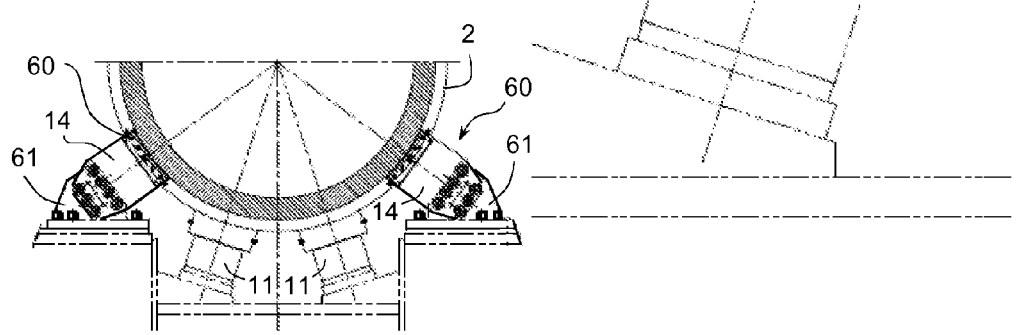
FIG. 20 is a schematic partial cross-sectional view of an axial hydrostatic bearing according to a further embodiment of the invention.

While the hydrostatic bearings 11, 12 have been described in the context of self-aligning hydrostatic bearings, it will be appreciated that the various aspects of the invention are also equally applicable to fixedly mounted hydrostatic bearings. Referring now to FIGS. 20 to 22, one example of a fixedly mounted hydrostatic bearing 60 is illustrated, where corresponding features have been given the same reference numerals. In this embodiment, the fixedly mounted hydrostatic bearing is an axial hydrostatic bearing 60 comprises a polymer pad 17 mounted on a base 14, which is fixedly mounted to mounting plate 61 via fasteners 62. Due to the polymeric nature of the polymer bearing pad 17, the outer surface 13B of the polymer pad will conform to the profile of the bearing surface 21 of the journal 4 that it is running against. This means that the axial hydrostatic bearing can provide some degree of self-alignment, if necessary, which is not possible in a conventional axial hydrostatic bearing. Aside from the manner of its mounting, the axial hydrostatic bearing 60 operates in substantially same manner as the self-aligning axial hydrostatic bearing 12 described above. Furthermore, while this embodiment concerns as axial hydrostatic bearing, it is also applicable to a fixedly mounted radial hydrostatic bearing.

Figure 23:
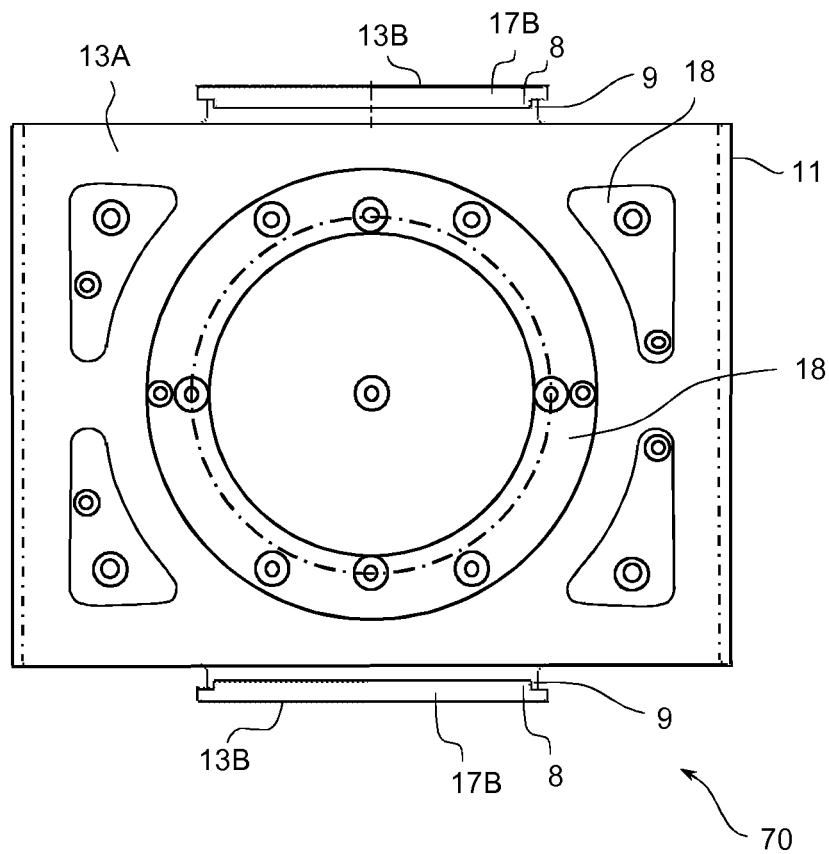
FIG. 23 is a schematic plan view of a hydrostatic bearing in accordance with a further embodiment of the invention.
Figure 24:
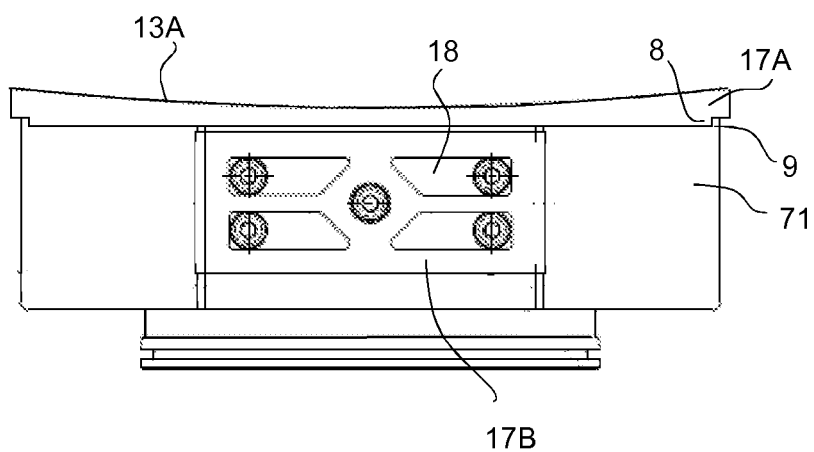
FIG. 24 is a schematic end view of the hydrostatic bearing of FIG. 23.
Figure 25:
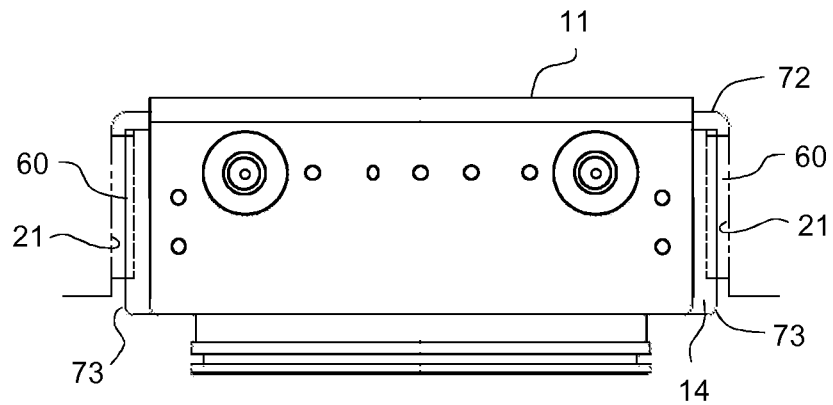
FIG. 25 is a schematic side view of the hydrostatic bearing of FIG. 23.

Referring now to FIGS. 23 to 25, a fluid bearing 70 according to another aspect of the invention is illustrated, where corresponding features have been given the same reference numerals. The fluid bearing 70 is a hydrostatic bearing that is a combination of the radial and axial hydrostatic bearings 11, 12, 60 described above. The base 71 has been adapted to receive both a polymer pad 17A having a radial or curved outer surface 13A mounted on its outer surface 72 and two polymer pads 17B having a substantially planar outer surface 13B mounted on opposing side surfaces 73 that are orthogonal to the outer surface 72. Thus, the combination hydrostatic bearing 70 acts as a self-aligning radial hydrostatic bearing 11 in one direction and as two fixedly mounted axial hydrostatic bearings 60 in two other directions, as best shown in FIG. 25. Again, due to the polymer's characteristics the outer surfaces 13B of the polymer pads 17B with conform to the profile of the bearing surface 21 of the journal 4 that it is running against. Thus, there is no need for a separate base for the axial hydrostatic bearings. The inventors contemplate that this combination hydrostatic bearing 70 avoids the need to install three separate hydrostatic bearings and thus allows for ease of installation in the mill 1. Due to the easy replacement of the polymer pads 17A, 17B, there is no need to remove the base 71 in the event one or more of the polymer pads 17A, 17B are damaged during operation of the mill 1. Thus, the combination hydrostatic bearing 70 creates cost savings in installation and repair.

The inventors also contemplate that the combination bearing 70 can be modified so as to minimise or eliminate the "axial float". Axial float is the difference between the distance between axial bearing pads and the distance between axial journal faces. Axial float is generally required so that the axial hydrostatic bearings are not tightly fitted with the mill journal 4. Typically, this axial float is set to around 0.5 to 1 mm, meaning that the mill journal is able to freely float in the axial direction by this 0.5 to 1 mm. A potential advantage of this combination bearing 70 is that the amount of axial float can be reduced or eliminated, since one of the axial bearings on the combination bearing 70 can be configured to move axially on a piston which is supplied by pressurised oil. This effectively ensures that axial float is minimised or removed.

Figure 26:
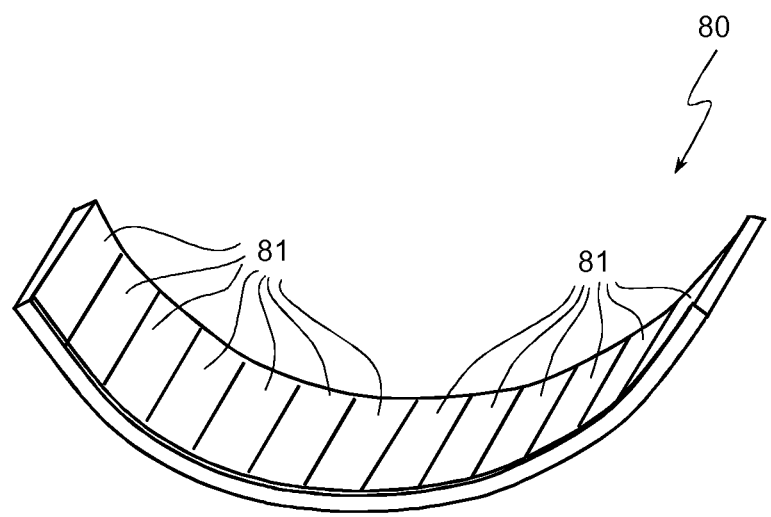
FIG. 26 is a schematic perspective view of a hydrostatic bearing in accordance with a further embodiment of the invention.

In other embodiments, the hydrostatic bearing takes the form of a slipper bearing 80, as best shown in FIG. 26. Due to the larger size of the bearing pad for a slipper bearing and its 120° curvature, it could be difficult to mould a single polymer pad 17. Thus, segmenting the bearing pad surface into multiple polymer pads or slats 81 having curved outer surfaces and laterally connected together enables the invention to be used for a slipper bearing. The lateral connections can be formed as described in relation to FIG. 19. Thus, the advantages of the polymer pad 17 can be extended to a slipper bearing.

In the preferred embodiments of the invention, the polymer pad 17 is made of polyetheretherketone (PEEK). However, it will be appreciated that other polymer materials are also suitable for the hydrostatic bearings 11, 12, such as PEEK composites, polyamide, polyamide composites, polyamide-imide and polyamide-imide composites. Also, while the preferred embodiments of the invention have been described as employing oil as the lubricating fluid, other lubricating fluids can be used such as water.

It will be appreciated by a person skilled in the art that the hydrostatic bearings of the preferred embodiments of the invention can be readily retrofitted into existing bearing assemblies, and thus do not require the replacement of each bearing in a milling apparatus.

While the preferred embodiments of the invention have been described using one of two possible fastener arrangements as illustrated in FIGS. 11, 11A, 12 and 12A, it will be appreciated that other fastener type arrangements may be used to implement the invention. For example, in one preferred form the fasteners are substantially retained within the recesses 18 by a locking element. The locking element comprises, but is not limited to, a liquid thread locker, a Scotch key, a non-loosening thread, a non-loosening washer or similar locking device.

In another embodiment, the outer (bearing) surface of the polymer bearing pad comprises two co-planar surfaces at 45° to each other. In this embodiment, the polymer bearing pad acts as both a linear and axial bearing pad simultaneously, similar to a lathe bed bearing.

It will further be appreciated that any of the features in the preferred embodiments of the invention can be combined together and are not necessarily applied in isolation from each other. For example, the chamfer 37 could be readily applied to the outermost polymer slats 81 in the slipper bearing to provide the advantages of reducing oil loss and elimination of oil pressure accumulators.

Also, while the preferred embodiment of the invention have been described in relation to hydrostatic bearings in general, it will be appreciated that each of the aspects of the invention and the corresponding preferred features are also applicable to other types of fluid bearings, such as hydrodynamic bearings and hybrid bearings that use a combination of hydrodynamic and a continuous hydrostatic flow for lubrication.

By providing a polymer bearing pad for a hydrostatic bearing in a bearing assembly, the invention confers numerous advantages over existing hydrostatic bearings with white metal/bronze bearing pads. The polymer bearing pads 17 reduces or eliminates damage to the journal and the base of the hydrostatic bearing, thus increasing product life and reducing the frequency of maintenance and repair. Moreover, the polymer pads 17 are easily replaceable, enabling easy installation and removal for repair. This advantage is facilitated by the use of the mounting portion 8, flange 9 and a mechanical fastening system to mount the polymer pad 17 to the base 14.

Also, the polymer pads 17 do not require tight machining tolerances, can conform to the profile of the journal, have reduced lubrication rates enabling the use of less oil, resistant to damage caused by the loss of oil or contaminants, and dampen any excessive shock forces, protecting the journal bearing surface. These advantages permits the operation of the hydrostatic bearings of the preferred embodiments of the invention at lower oil film thicknesses, thus reducing oil consumption, permitting the use of smaller and cheaper lubrication systems and more efficient power consumption and conserving the use of oil.

Also, the use of chamfer in hydrostatic bearings in general obviates the need for expensive accumulator systems that are difficult to operate and maintain. Furthermore, the chamfer conserves the use of oil and thus reduces oil consumption. Furthermore, since the base is of a standard design, the hydrostatic bearings of the invention can be readily retrofitted to existing mills. In all these respects, the invention represents a practical and commercially significant improvement over the prior art.

Although the invention has been described with reference to specific examples, it will be appreciated by those skilled in the art that the invention may be embodied in many other forms.

The invention claimed is:

1. A bearing assembly for supporting a journal of a grinding mill body, comprising a frame and a plurality of fluid bearings, said fluid bearings each comprising a polymer bearing pad mounted to a base, said polymer bearing pad comprising an outer surface, at least one recess for receiving lubricating fluid from at least one passage of said base and distributing said lubricating fluid to said outer surface and mounting element for securely mounting said polymer bearing pad to said base, said base also comprising at least one lubricating fluid supply port in fluid communication with said at least one passage, wherein said base is mounted to said frame so that said fluid bearings self adjust to changes in the angular position of the journal during operation of said grinding mill body.

2. The bearing assembly of claim 1, wherein said mounting element comprises a mounting portion extending from said polymer bearing pad, said mounting portion comprising a protrusion from a mounting surface opposite to said outer surface for engaging a flange of said base, said flange being located at an outer edge of said base.

3. The bearing assembly of claim 1, wherein said mounting element comprises at least one opening for receiving at least one fastener for mounting said polymer pad to said base; said at least one recess comprises a locking tab for retaining a head portion of said fastener within said at least one one recess and said at least one fastener comprises a bore for conveying lubricating fluid from said at least one passage to said at least one recess.

4. The bearing assembly of claim 1, wherein said mounting element comprises at least one opening for receiving at least one fastener for mounting said polymer pad to said base, said bearing assembly further comprising a locking element for retaining said at least one fastener within said at least one recess.

5. The bearing assembly of claim 1, wherein said polymer bearing pad substantially covers an outer surface of said base to create a fluid seal between said polymer bearing pad and said base.

6. The bearing assembly of claim 1, further comprising a chamfer at an outer edge for retaining lubricating fluid at said outer edge and transferring said lubricating fluid to a journal, wherein said chamfer has an outer edge that is displaced from a journal when said journal engages said polymer pad.

7. The bearing assembly of claim 1, said at least one recess of said polymer bearing pad comprises at least one interconnecting passage for fluidly connecting said at least one recess to said at least one passage of said base.

8. The bearing assembly of claim 1, further comprising a plurality of said polymer bearing pads, wherein said respective outer surfaces of said polymer bearing pads form a substantially uniform bearing surface for said journal, wherein each of said polymer bearing pads comprises at least one lateral connecting portion for mutual engagement with a corresponding lateral connecting portion of an adjacent polymer bearing pad.

9. The bearing assembly of claim 1, wherein said base further comprises a first surface, a second surface, a plurality of said at least one passages and a plurality of said at least one lubricating fluid supply ports, wherein said at least one passages are in fluid communication with said at least one lubricating fluid supply ports, said first surface and said second surface, and
   wherein there is a plurality of said polymer bearing pads, a first of said polymer bearing pads being mountable to said first surface and a second of said polymer bearing pads being mountable to said second surface,
   wherein said first polymer bearing pad comprises a first outer surface and at least one recess for receiving lubricating fluid from at least one of said plurality of passages and distributing said lubricating fluid to said first outer surface, and
   said second polymer bearing pad comprises a second outer surface and at least one recess for receiving lubricating fluid at least one of said plurality of passages and distributing said lubricating fluid to said second outer surface,
wherein said first outer surface is partially curved such that said first polymer bearing pad acts as a radial hydrostatic bearing and said second outer surface is substantially planar such that said second polymer bearing pad acts as an axial bearing.

10. The bearing assembly of claim 1, wherein said polymer bearing pad is removably mounted to said base.

11. A bearing assembly for supporting a journal of a grinding mill body, comprising a frame and a plurality of fluid bearings, said fluid bearings each comprising a polymer bearing pad mounted to a base, said polymer bearing pad comprising an outer surface, at least one recess for receiving lubricating fluid from at least one passage of said base and distributing said lubricating fluid to said outer surface and mounting element for securely mounting said polymer bearing pad to said base, said base also comprising at least one lubricating fluid supply port in fluid communication with said at least one passage, wherein said base is fixedly mounted to said frame.

12. The bearing assembly of claim 11, wherein said mounting element comprises a mounting portion extending from said polymer bearing pad, said mounting portion comprising a protrusion from a mounting surface opposite to said outer surface for engaging a flange located at an outer edge of said base.

13. The bearing assembly of claim 11, wherein said mounting element comprises at least one opening for receiving at least one fastener for mounting said polymer pad to said base; said at least one recess comprises a locking tab for retaining a head portion of said fastener within said at least one recess and said at least one fastener comprising a bore for conveying lubricating fluid from said at least one passage to said at least one recess.

14. The bearing assembly of claim 11, wherein said mounting element comprises at least one opening for receiving at least one fastener for mounting said polymer pad to said base, said bearing assembly further comprising a locking element for retaining said at least one fastener within said at least one recess.

15. The bearing assembly of claim 11, wherein said polymer bearing pad substantially covers an outer surface of said base to create a fluid seal between said polymer bearing pad and said base.

16. The bearing assembly of claim 11, further comprising a chamfer at an outer edge for retaining lubricating fluid at said outer edge and transferring said lubricating fluid to a journal, said chamfer having an outer edge that is displaced from a journal when said journal engages said polymer pad.

17. The bearing assembly of claim 11, said at least one recess of said polymer bearing pad comprises at least one interconnecting passage for fluidly connecting said at least one recess to said at least one passage of said base.

18. The bearing assembly of claim 11, further comprising a plurality of said polymer bearing pads, wherein said respective outer surfaces of said polymer pads form a substantially uniform bearing surface for said journal, wherein each of said polymer bearing pads comprises at least one lateral connecting portion for mutual engagement with a corresponding lateral connecting portion of an adjacent polymer bearing pad.

19. The bearing assembly of claim 11, wherein said base further comprises a first surface, a second surface, a plurality of said at least one passages and a plurality of said at least one lubricating fluid supply ports, wherein said at least one passages are in fluid communication with said at least one lubricating fluid supply ports, said first surface and said second surface, and
   wherein there is a plurality of said polymer bearing pads, a first of said polymer bearing pads being mountable to said first surface and a second of said polymer bearing pads being mountable to said second surface,
   wherein said first polymer bearing pad comprises a first outer surface and at least one recess for receiving lubricating fluid from at least one of said plurality of passages and distributing said lubricating fluid to said first outer surface, and
   said second polymer bearing pad comprises a second outer surface and at least one recess for receiving lubricating fluid at least one of said plurality of passages and distributing said lubricating fluid to said second outer surface, wherein said first outer surface is partially curved such that said first polymer bearing pad acts as a radial hydrostatic bearing and said second outer surface is substantially planar such that said second polymer bearing pad acts as an axial bearing.

20. The bearing assembly of claim 11, wherein said polymer bearing pad is removably mounted to said base.

21. A multidirectional fluid bearing for a journal, comprising:
- a base having a first surface orthogonal to a second surface, one or more lubricating fluid supply ports and a plurality of passages in fluid communication with said lubricating fluid supply ports, said first surface and said second surface,
- a first polymer bearing pad mountable to said first surface, said polymer bearing pad having a first outer surface and at least one recess for receiving lubricating fluid from at least one of said plurality of passages and distributing said lubricating fluid to said first outer surface, and
- a second polymer bearing pad mountable to said second surface, said second polymer bearing pad having a second outer surface and at least one recess for receiving lubricating fluid at least one of said plurality of passages and distributing said lubricating fluid to said second outer surface,
- wherein at least one of said first and second polymer bearing pads comprises at least one opening for receiving at least one fastener for mounting said at least one polymer bearing pad to said base, wherein said at least one recess comprises a locking tab for retaining a head portion of said fastener within said at least one recess, said head portion being tapered to facilitate retention of said at least one fastener within said at least one recess by said locking tab, and wherein said at least one fastener comprises a bore for conveying lubricating fluid from said at least one passage to said at least one recess, said at least one fastener being partially received in said at least one passage.

22. The multidirectional fluid bearing of claim 21, said first polymer bearing pad substantially covers said first surface and said second polymer bearing pad substantially covers said second surface to respectively create fluid seals between said first and second polymer bearing pads and said base.

23. The multidirectional fluid bearing of claim 21, wherein at least one of said first and second polymer bearing pads comprises a chamfer at an outer edge for retaining lubricating fluid at said outer edge and transferring said lubricating fluid to a journal, wherein said chamfer has an outer edge that is displaced from a journal when said journal engages said at least one polymer bearing pad.

24. The multidirectional fluid bearing of claim 21, wherein there is a plurality of at least one of said first and second polymer bearing pads, wherein said respective outer surfaces of said plurality of at least one of said first and second polymer pads form a substantially uniform bearing surface for said journal, wherein each of said plurality of at least one of said first and second polymer bearing pads comprises at least one lateral connecting portion for mutual engagement with a corresponding lateral connecting portion of an adjacent polymer bearing pad.

25. The multidirectional fluid bearing of claim 21, wherein said base comprises at least one flange for engagement with a mounting portion of at least one of said first and second polymer bearing pads to securely mount said at least one polymer bearing pad to said base, said flange being located at an outer edge of said base.

26. The multidirectional fluid bearing of claim 21, wherein said first outer surface is partially curved such that said first polymer bearing pad acts as a radial hydrostatic bearing and said second outer surface is substantially planar such that said second polymer bearing pad acts as an axial bearing.

* * * * *